(12) United States Patent
Kuo

(10) Patent No.: US 8,245,721 B2
(45) Date of Patent: Aug. 21, 2012

(54) TUBE COUPLING DEVICE HAVING CHECK VALVE

(76) Inventor: Kuang-Ming Kuo, Taipei Hsien (TW)

( * ) Notice: Subject to any disclaimer, the term of this patent is extended or adjusted under 35 U.S.C. 154(b) by 332 days.

(21) Appl. No.: 12/798,851

(22) Filed: Apr. 13, 2010

(65) Prior Publication Data

US 2011/0248201 A1 Oct. 13, 2011

(51) Int. Cl.
*E03C 1/10* (2006.01)
(52) U.S. Cl. ........................................... 137/217
(58) Field of Classification Search .................. 137/215, 137/216, 217, 218
See application file for complete search history.

(56) References Cited

U.S. PATENT DOCUMENTS

| | | |
|---|---|---|
| 1,196,405 A | 8/1916 | Steeg |
| 1,204,316 A | 11/1916 | Renner |
| 1,722,891 A | 7/1929 | Boosey |
| 3,083,723 A * | 4/1963 | Duchin ........................ 137/218 |
| 3,145,724 A * | 8/1964 | Pelzer ......................... 137/217 |
| 4,620,330 A | 11/1986 | Izzi, Sr. |
| 4,669,497 A * | 6/1987 | Tenhengel ................... 137/218 |
| 5,228,471 A * | 7/1993 | Hoeptner, III ............... 137/218 |
| 6,761,183 B1 * | 7/2004 | Hoeptner, III ............... 137/218 |
| 7,458,388 B2 * | 12/2008 | Huang ......................... 137/218 |

* cited by examiner

*Primary Examiner* — Craig Schneider
(74) *Attorney, Agent, or Firm* — Charles E. Baxley

(57) ABSTRACT

A tube coupling device includes a coupling member having an upper peripheral casing formed by a peripheral flange and a peripheral wall, a number of openings formed in the peripheral flange and communicative with an environment of the peripheral casing, a water guide plate engaged into the peripheral fence and engaged with the peripheral wall and having one or more passages, a partition member engaged into the peripheral casing and having a bore for water to flow into the coupling member, and a receptacle engaged into the coupling member, a valve member biased by a spring biasing member to engage with the partition member and to form a check valve.

8 Claims, 4 Drawing Sheets

TUBE COUPLING DEVICE HAVING CHECK VALVE

BACKGROUND OF THE INVENTION

1. Field of the Invention

The present invention relates to a tube or plumbing coupling device or joint, and more particularly to a tube coupling device including an improved washer or insulator mechanism for suitably coupling two tubular members together and for making a suitable water seal between the tubular members and having a check valve device for controlling the water flowing between the tubular members.

2. Description of the Prior Art

Typical valves or tube or conduit or plumbing coupling devices or joints comprise a pivotal valve member adapted to cooperate with a neck of a drain casing, and to constitute a closure for the neck of the drain casing.

For example, U.S. Pat. No. 1,196,405 to Steeg, U.S. Pat. No. 1,204,316 to Renner, and U.S. Pat. No. 1,722,891 to Boosey disclose three examples of the typical conduit couplings or stop valves or backwater floor drains each also comprising a pivotal valve member pivotally or rotatably coupled to a neck or mouth piece for constituting a closure for the neck or the mouth piece of the floor drains or the like.

However, the valve members may only be used to selectively block the neck or the mouth piece or to control the water flowing through the neck or the mouth piece, but may not be used to selectively couple two tubular members together.

U.S. Pat. No. 4,620,330 to Izzi, Sr. discloses another typical conduit coupling or plumbing coupling device or joint for providing with a single coupling unit construction a variety of different functions including clean-out access, pipe end dust covers or vents, drain assemblies, threaded pipe to plastic couplings, flush floor or wall mount, snap-in friction fit or permanent solvent welded installation, etc.

However, the typical conduit coupling or plumbing coupling device or joint also may not be used to selectively couple two tubular members together, and also may not be used to selectively control the water flowing between two tubular members that are coupled together.

The present invention has arisen to mitigate and/or obviate the afore-described disadvantages of the conventional tube coupling devices.

SUMMARY OF THE INVENTION

The primary objective of the present invention is to provide a tube coupling device including an improved washer or insulator mechanism for suitably coupling two tubular members together and for making a suitable water seal between the tubular members and having a check valve device for controlling the water flowing between the two coupled tubular members.

In accordance with one aspect of the invention, there is provided a tube coupling device comprising a coupling member including a lower portion for coupling to a tubular member, and including a chamber formed in the lower portion of the coupling member, and including a peripheral casing formed on an upper portion of the coupling member, the peripheral casing including a peripheral flange extended from the upper portion of the coupling member and including a peripheral wall located above the peripheral flange and spaced from the peripheral flange for forming an inner peripheral space between the peripheral flange and the peripheral wall, and including a number of openings formed in the peripheral flange and communicative with the inner peripheral space of the peripheral casing and communicative with an environment of the peripheral casing, and including a peripheral fence extended upwardly from the peripheral wall of the peripheral casing, a lock nut attached to the peripheral fence of the coupling member for receiving a water, a water guide plate engaged into the peripheral fence and engaged with the peripheral wall of the peripheral casing, and including at least one passage formed therein, a partition member including an outer peripheral flange engaged into the inner peripheral space of the peripheral casing and anchored between the peripheral flange and the peripheral wall of the peripheral casing, and including a bore formed therein for allowing the water to flow from the passage of the water guide plate and into the chamber of the coupling member, and a receptacle engaged into the chamber of the coupling member and including a space formed therein for receiving a valve member, and a spring biasing member engaged with the valve member for biasing the valve member to selectively engage with the partition member and to selectively block the bore of the partition member, and the water flowing from the lock nut and flowing through the passage of the water guide plate being capable of forcing the valve member away from the partition member to allow the water to flow through the bore of the partition member and to flow into the space of the receptacle, and an air from the environment of the peripheral casing being capable of selectively flowing through the openings of the peripheral flange and into the space of the receptacle.

The valve member includes a recess for engaging with the spring biasing member and for anchoring the spring biasing member to the receptacle. The valve member includes at least one flap having the recess formed in the flap for engaging with the spring biasing member.

The coupling member includes a peripheral rib extended radially and inwardly therefrom, and the receptacle includes a peripheral shoulder formed therein for engaging with the peripheral rib of the coupling member and for anchoring the receptacle to the coupling member.

The receptacle includes a cover attached thereto and having an opening formed therein for partially receiving the valve member and for allowing the valve member to be partially extended out through the opening of the cover and to selectively engage with the partition member and to selectively block the bore of the partition member.

The receptacle includes at least one protrusion extended therefrom, and the cover includes at least one depression formed therein for engaging with the protrusion of the receptacle and for anchoring the cover to the receptacle and for preventing the cover from being moved or rotated relative to the receptacle.

The receptacle includes at least one notch formed therein, and the cover includes at least one projection for engaging with the notch of the receptacle and for anchoring the cover to the receptacle and for preventing the cover from being moved or rotated relative to the receptacle.

A sealing ring may further be engaged into the peripheral fence and includes a lower portion engaged with the water guide plate and the peripheral fence, and the sealing ring is selectively engaged with the lock nut for making a water tight seal between the peripheral fence of the coupling member and the lock nut.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
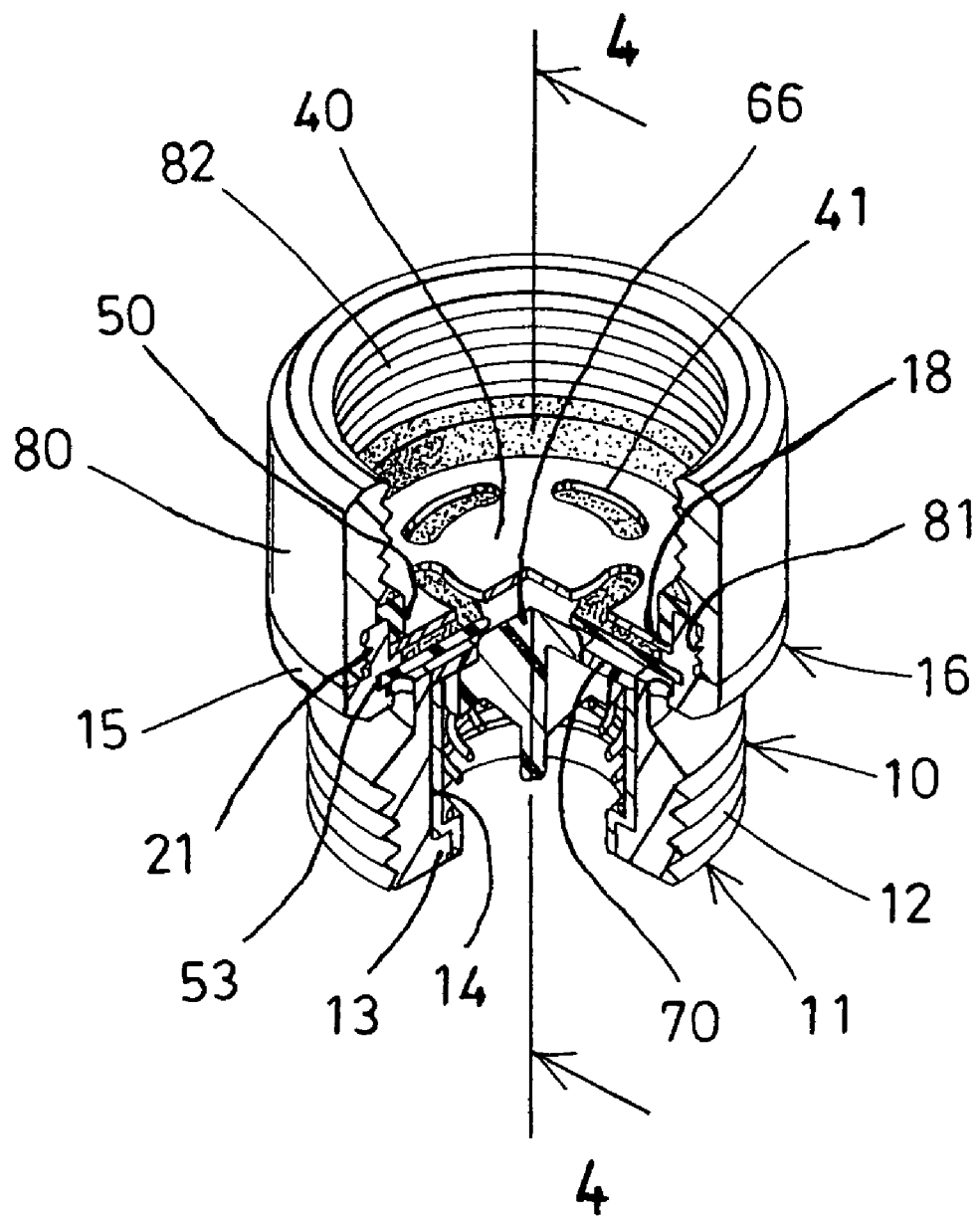
FIG. 1 is a perspective view of a tube coupling device in accordance with the present invention, in which a portion or one quarter of the tube coupling device has been cut off for showing the inner structure of the tube coupling device.
Figures 2, 3:
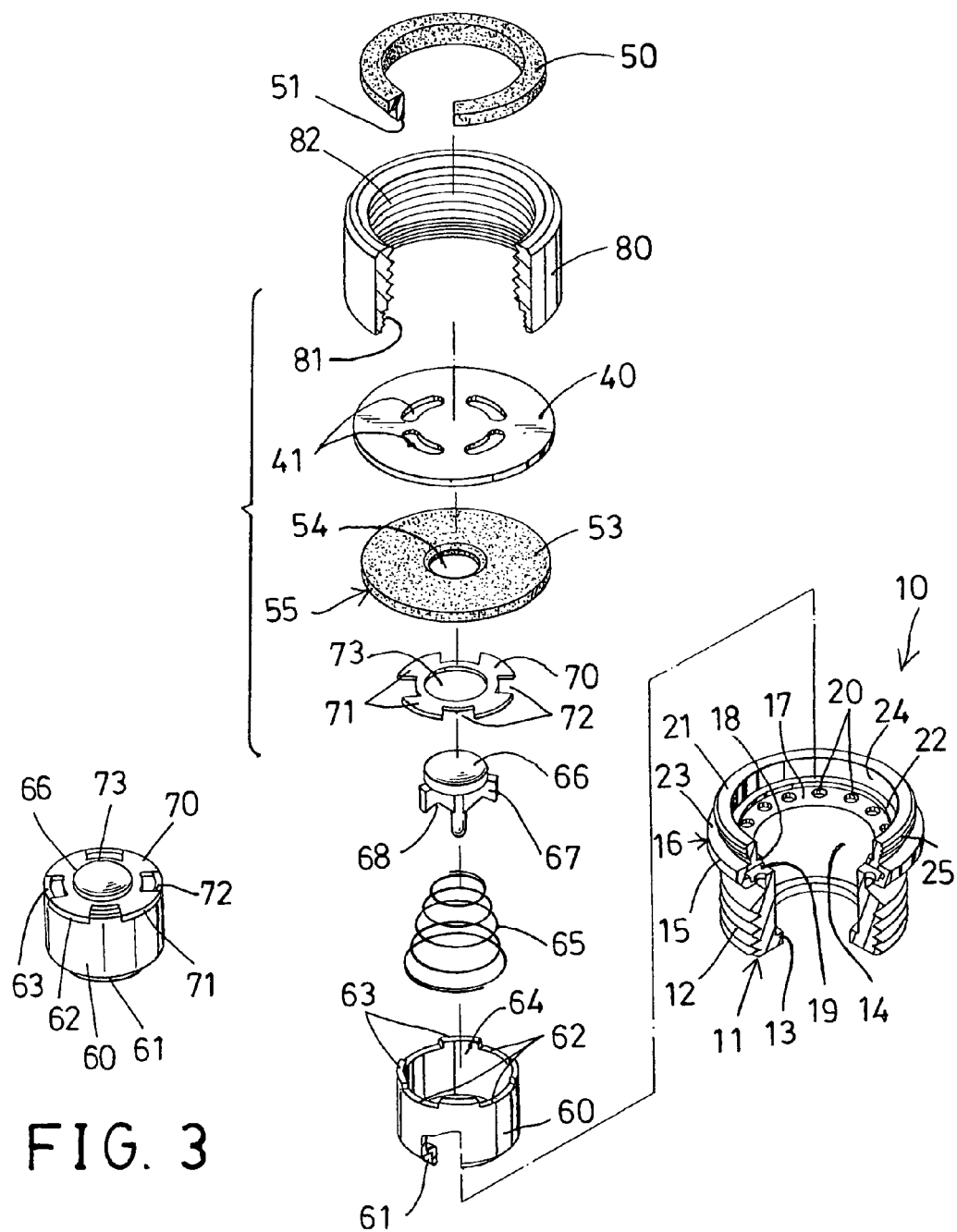
FIG. 2 is a partial exploded view illustrating the parts or elements of the tube coupling device.
FIG. 3 is a partial perspective view illustrating one of the parts or elements of the tube coupling device.

Referring to the drawings, and initially to FIGS. 1-4, a tube coupling device in accordance with the present invention comprises an intermediate and/or substantially cylindrical coupling body or member 10 including a lower portion 11 having an outer thread 12 formed thereon for threading or engaging with a tubular member 90 (FIGS. 4, 5) and for detachably attaching or mounting or securing or coupling the tubular member 90 to the coupling member 10, and including a peripheral rib 13 extended radially and inwardly therefrom, such as extended from the lower portion 11 of the coupling member 10, and including a chamber 14 formed in the lower portion 11 of the coupling member 10, and including a peripheral casing 15 formed or provided on or extended from the upper portion 16 of the coupling member 10, such as extended radially and outwardly from the upper portion 16 of the coupling member 10.

Figure 4:
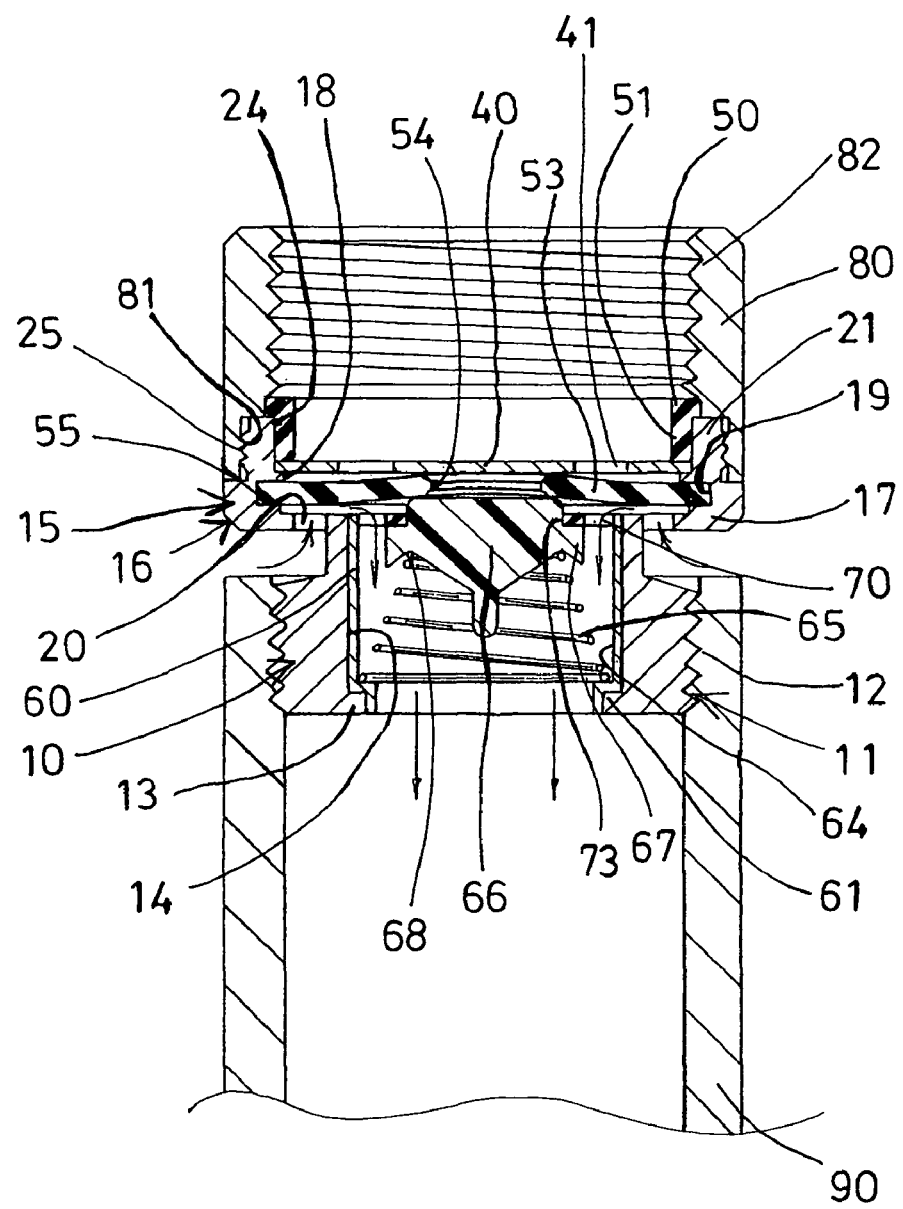
FIG. 4 is a partial cross sectional view of the tube coupling device, taken along lines 4-4 of FIG. 1.
Figure 5:
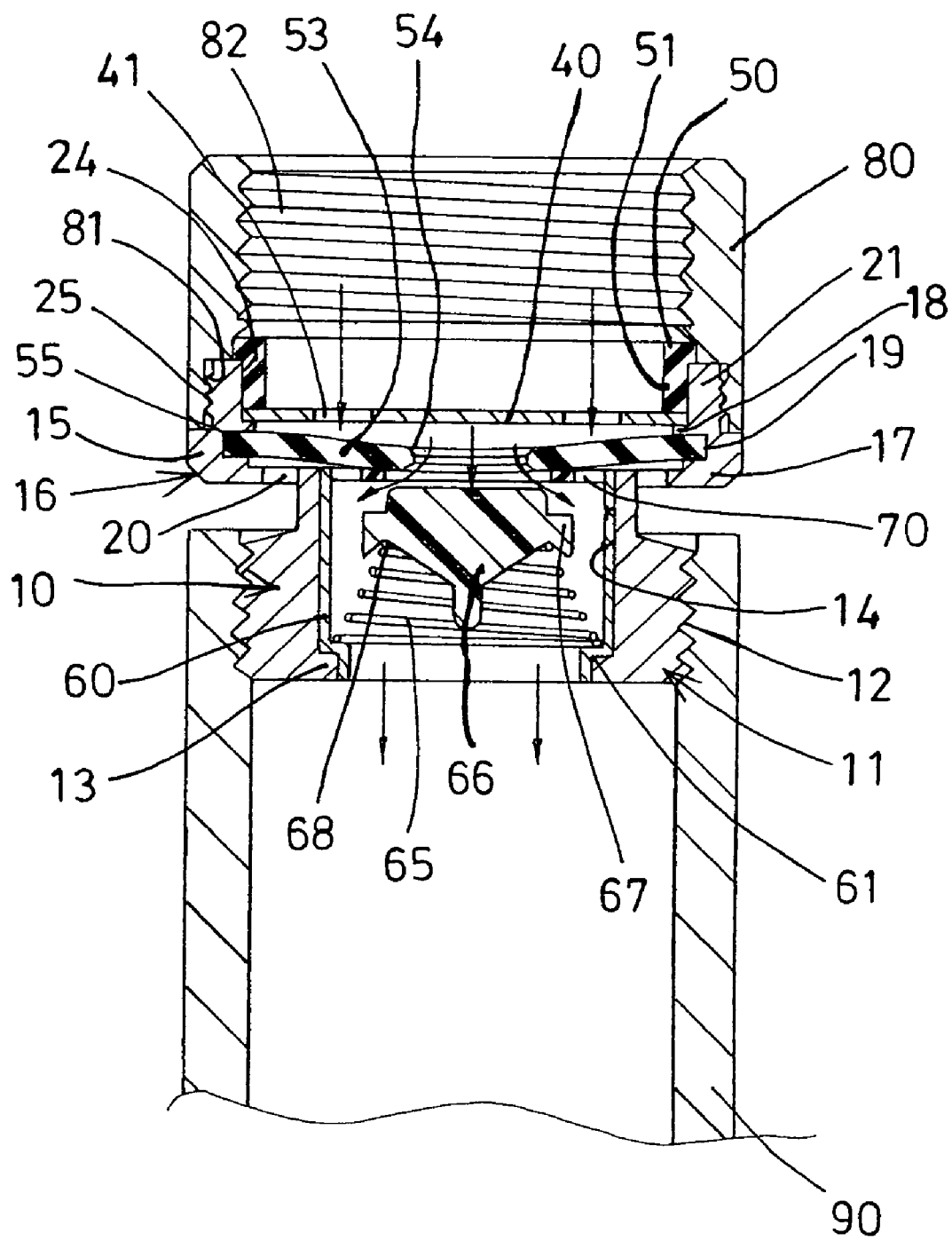
FIG. 5 is a partial cross sectional view similar to FIG. 4, illustrating the operation of the tube coupling device.

For example, the peripheral casing 15 includes a peripheral flange 17 extended laterally or radially and outwardly from the upper portion 16 of the coupling member 10 and substantially perpendicular to the coupling member 10, and includes a peripheral wall 18 located above the peripheral flange 17 and substantially parallel to the peripheral flange 17 and spaced upwardly from the peripheral flange 17 for forming an inner peripheral space 19 between the peripheral flange 17 and the peripheral wall 18, and includes a number of orifices or openings 20 formed in the peripheral flange 17 and preferably equally spaced from each other and communicative with the inner peripheral space 19 of the peripheral casing 15, and also communicative with the outside environment of the peripheral casing 15, best shown in FIGS. 4, 5, and offset from the chamber 14 of the coupling member 10, or the openings 20 of the coupling member 10 are not communicative with the chamber 14 of the coupling member 10.

The coupling member 10 further includes a peripheral fence 21 extended upwardly from the middle portion of the upper peripheral wall 18 of the peripheral casing 15 for forming or defining an inner peripheral shoulder 22 and an outer peripheral shoulder 23, and for forming or defining an inner compartment 24 therein, and includes an outer thread 25 formed on the outer peripheral portion of the peripheral fence 21 for attaching or threading or engaging with an inner thread 81 of a lock nut 80 which includes an inner thread 82 for threading or engaging with another tubular member (not shown), or for attaching or mounting or securing or coupling to a water reservoir (not shown), such as the water faucet for receiving the water from the water reservoir or faucet. The lock nut 80 may be engaged with the outer peripheral shoulder 23 of the peripheral casing 15 or of the coupling member 10.

A washer or water guide plate 40 is engaged into the compartment 24 of the peripheral fence 21 and engaged with the inner peripheral shoulder 22 or the upper peripheral wall 18 of the peripheral casing 15 for stably anchoring or positioning or mounting the water guide plate 40 to the peripheral fence 21 and the peripheral casing 15 of the coupling member 10, and the water guide plate 40 includes one or more off-center apertures or passages 41 formed therein for allowing the water to flow from the lock nut 80 or the water reservoir or faucet toward and through the passages 41 of the water guide plate 40 and then into the chamber 14 of the coupling member 10 and/or into the tubular member 90. A gasket or sealing ring 50 is engaged into the compartment 24 of the peripheral fence 21 and includes a lower portion 51 engaged with the water guide plate 40 and/or the peripheral fence 21, and the sealing ring 50 is also engaged with the lock nut 80 for making a suitable water tight seal between or among the peripheral fence 21 of the coupling member 10 and the lock nut 80 and/or the water reservoir or the water faucet.

A flexible or resilient or spring valve member or washer or gasket or flexible partition member 53 is engaged into the peripheral casing 15 and includes a center bore 54 formed therein for allowing the water to flow from the passages 41 of the water guide plate 40 and then into the chamber 14 of the coupling member 10 and/or into the tubular member 90, and includes an outer peripheral flange 55 engaged into the inner peripheral space 19 of the peripheral casing 15 and anchored or positioned or retained between the peripheral flange 17 and the peripheral wall 18 of the peripheral casing 15, and thus for guiding or controlling the water flowing between the lock nut 80 and the tubular member 90, also best shown in FIGS. 4, 5.

A receptacle 60 is engaged into the chamber 14 of the coupling member 10 and includes a peripheral shoulder 61 formed therein, such as formed in the lower portion thereof for receiving or engaging with the peripheral rib 13 of the coupling member 10 and for anchoring or positioning or mounting or securing the receptacle 60 in the chamber 14 of the coupling member 10 and for preventing the receptacle 60 from being moved relative to the coupling member 10, and includes one or more notches 62 formed therein, such as formed in the upper portion thereof for forming or defining one or more keys or protrusions 63 on the upper portion thereof, and includes a space 64 formed therein for receiving a spring biasing member 65 and a valve member 66, in which the valve member 66 includes one or more radially extended fins or flaps 67 each having a recess 68 formed in the lower portion thereof for receiving or engaging with the spring biasing member 65 and for stably or solidly anchoring or positioning or mounting or retaining the spring biasing member 65 in the space 64 of the receptacle 60 and for allowing the spring biasing member 65 to stably engage with and to bias or force or move the valve member 66 toward the partition member 53.

A guiding plate or cover 70 is attached or mounted or secured onto the upper portion of the receptacle 60 and includes one or more projections 71 for engaging into or with the notches 62 of the receptacle 60, and/or includes one or more depressions 72 formed therein for receiving or engaging with the protrusions 63 of the receptacle 60 and for stably or solidly anchoring or positioning or mounting or securing the cover 70 to the upper portion of the receptacle 60, the cover 70 includes an opening 73 formed therein for partially receiving or engaging with the valve member 66 or for allowing the valve member 66 to be partially engaged or extended out through the opening 73 of the cover 70 and to be selectively biased by the spring biasing member 65 to engage with the partition member 53 (FIG. 4) and so as to selectively block the bore 54 of the partition member 53.

In addition, the partition member 53 may also be biased or forced by the valve member 66 to engage with the water guide plate 40 and to selectively block the passages 41 of the water guide plate 40 and thus to prevent the water from flowing through the passages 41 of the water guide plate 40 and/or from flowing through the bore 54 of the partition member 53. It is to be noted that the depressions 72 of the cover 70 include an area or width or dimension slightly greater than that of the protrusions 63 of the receptacle 60 for allowing the water or the air to selectively flow through the protrusions 63 of the receptacle 60 and to flow into the space 64 of the receptacle 60 (FIG. 4). When the water is supplied or flows into the lock nut 80, the water may force or move the valve member 66 onto the spring biasing member 65 and may disengage the valve member 66 from the partition member 53 to allow the water to flow through the bore 54 of the partition member 53 and into or through the space 64 of the receptacle 60, and then to flow into the tubular member 90.

In operation, as shown in FIG. 4, when no water is supplied or flows into the lock nut 80, the spring biasing member 65 may bias the valve member 66 to engage with the partition member 53 in order to selectively block the bore 54 of the partition member 53 and to prevent the water from flowing into the chamber 14 of the coupling member 10. At this moment, the air from the outside environment of the peripheral casing 15 may flow through the openings 20 of the peripheral casing 15 and may then flow into the space formed between the partition member 53 and the peripheral flange 17 of the peripheral casing 15, and may then flow through the depressions 72 of the cover 70 and may then flow into the space 64 of the receptacle 60.

It is to be noted that the partition member 53 is resiliently engaged with and blocked by the valve member 66. Accordingly, when in the winter or snowy days, and when the water in the lock nut 80 and/or the tubular member or the water faucet or the water reservoir is iced and expanded, the partition member 53 may be forced by the expanded and iced water to engage with the valve member 66, such that the lock nut 80 and/or the tubular member or the water faucet or the water reservoir may be prevented from being broken or damaged by the expanded and iced water. In addition, the chamber 14 of the coupling member 10 is covered by the receptacle 60, and the coupling member 10 may be prevented from being contacted by the water flowing into the space 64 of the receptacle 60, such that the materials in the coupling member 10 may be prevented from being released into the water.

Accordingly, the tube coupling device includes an improved washer or insulator mechanism for suitably coupling two tubular members together and for making a suitable water seal between the tubular members and having a check valve device for controlling the water flowing between the two coupled tubular members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tube coupling device comprising:
a coupling member including a lower portion for coupling to a tubular member, and including a chamber formed in said lower portion of said coupling member, and including a peripheral casing formed on an upper portion of said coupling member, said peripheral casing including a peripheral flange extended from said upper portion of said coupling member and including a peripheral wall located above said peripheral flange and spaced from said peripheral flange for forming an inner peripheral space between said peripheral flange and said peripheral wall, and including a plurality of openings formed in said peripheral flange and communicative with said inner peripheral space of said peripheral casing and communicative with an environment of said peripheral casing, and including a peripheral fence extended upwardly from said peripheral wall of said peripheral casing, a lock nut attached to said peripheral fence of said coupling member for receiving a water, a water guide plate engaged into said peripheral fence and engaged with said peripheral wall of said peripheral casing, and including at least one passage formed therein, a partition member including an outer peripheral flange engaged into said inner peripheral space of said peripheral casing and anchored between said peripheral flange and said peripheral wall of said peripheral casing, and including a bore formed therein for allowing the water to flow from said at least one passage of said water guide plate and into said chamber of said coupling member, and a receptacle engaged into said chamber of said coupling member and including a space formed therein for receiving a valve member, and a spring biasing member engaged with said valve member for biasing said valve member to selectively engage with said partition member and to selectively block said bore of said partition member, and the water flowing from said lock nut and flowing through said at least one passage of said water guide plate being capable of forcing said valve member away from said partition member to allow the water to flow through said bore of said partition member and to flow into said space of said receptacle, and an air from the environment of said peripheral casing being capable of selectively flowing through said openings of said peripheral flange and into said space of said receptacle.

2. The tube coupling device as claimed in claim 1, wherein said valve member includes a recess for engaging with said spring biasing member and for anchoring said spring biasing member to said receptacle.

3. The tube coupling device as claimed in claim 2, wherein said valve member includes at least one flap having said recess formed in said at least one flap for engaging with said spring biasing member.

4. The tube coupling device as claimed in claim 1, wherein said coupling member includes a peripheral rib extended radially and inwardly therefrom, and said receptacle includes a peripheral shoulder formed therein for engaging with said peripheral rib of said coupling member and for anchoring said receptacle to said coupling member.

5. The tube coupling device as claimed in claim 1, wherein said receptacle includes a cover attached thereto and having an opening formed therein for partially receiving said valve member and for allowing said valve member to be partially extended out through said opening of said cover and to engage with said partition member and to selectively block said bore of said partition member.

6. The tube coupling device as claimed in claim 5, wherein said receptacle includes at least one protrusion extended therefrom, and said cover includes at least one depression formed therein for engaging with said at least one protrusion of said receptacle and for anchoring said cover to said receptacle.

7. The tube coupling device as claimed in claim 5, wherein said receptacle includes at least one notch formed therein, and said cover includes at least one projection for engaging with said at least one notch of said receptacle and for anchoring said cover to said receptacle.

8. The tube coupling device as claimed in claim 1 further comprising a sealing ring engaged into said peripheral fence and including a lower portion engaged with said water guide plate and said peripheral fence, and said sealing ring being engaged with said lock nut for making a water tight seal between said peripheral fence of said coupling member and said lock nut.

* * * * *